(12) United States Patent
Tsai

(10) Patent No.: US 8,196,290 B2
(45) Date of Patent: Jun. 12, 2012

(54) SERIAL-CONNECTION FITTING ASSEMBLY AND PUNCH APPRATUS APPLIED THEREFORE

(76) Inventor: Lore Tsai, Taichung (TW)

( * ) Notice: Subject to any disclaimer, the term of this patent is extended or adjusted under 35 U.S.C. 154(b) by 480 days.

(21) Appl. No.: 12/554,012

(22) Filed: Sep. 4, 2009

(65) Prior Publication Data

US 2011/0056073 A1 Mar. 10, 2011

(51) Int. Cl.
*B23Q 7/10* (2006.01)
*F16B 17/00* (2006.01)
(52) U.S. Cl. .......................... 29/813; 403/345
(58) Field of Classification Search .................... 29/813, 29/809, 811.2, 243.523, 243.56; 403/345
See application file for complete search history.

(56) References Cited

U.S. PATENT DOCUMENTS 5,191,647 A * 3/1993 Masaki .......................... 345/501
6,823,990 B2 * 11/2004 Gaudron ........................ 206/347
* cited by examiner

*Primary Examiner* — John C Hong
(74) *Attorney, Agent, or Firm* — Guice Patents PLLC

(57) ABSTRACT

A serial-connection fitting assembly and a punch apparatus applied therefore are disclosed. The serial-connection fitting assembly includes a plurality of fitting members and a plurality of joining members staggered with the fitting members in alignment. Each fitting member has a conjunction hole radially arranged therein, and a groove indented radially on a top surface thereof with the same axial direction of the conjunction hole. The serial-connection fitting assembly is loaded in the punch apparatus, and the fitting members could be punched into pre-holes of respective plates one by one. Therefore, the labor hour for inserting the fitting members could be saved, and the efficiency for assembling the plates would be increased.

20 Claims, 11 Drawing Sheets

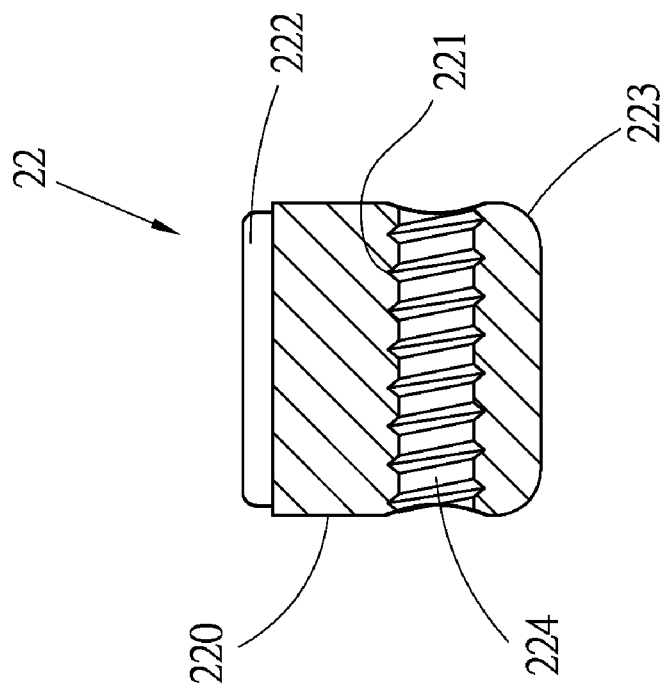
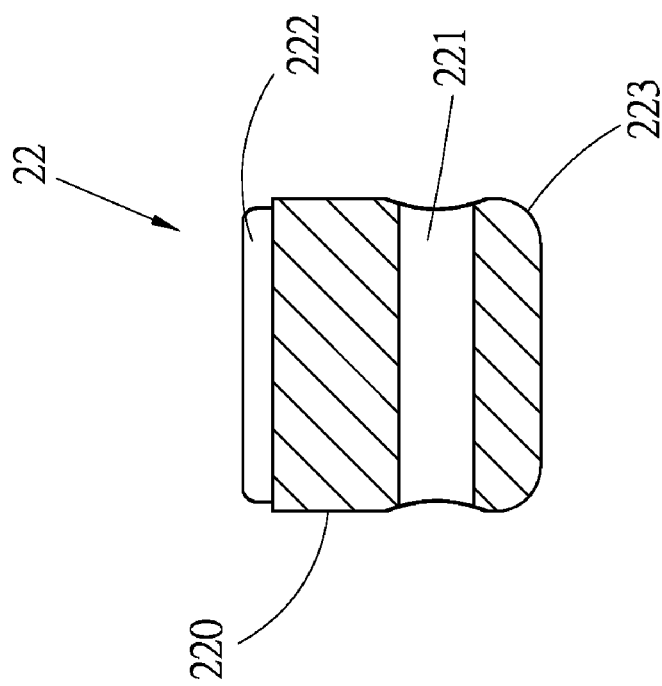
Fig. 5A
Fig. 5B

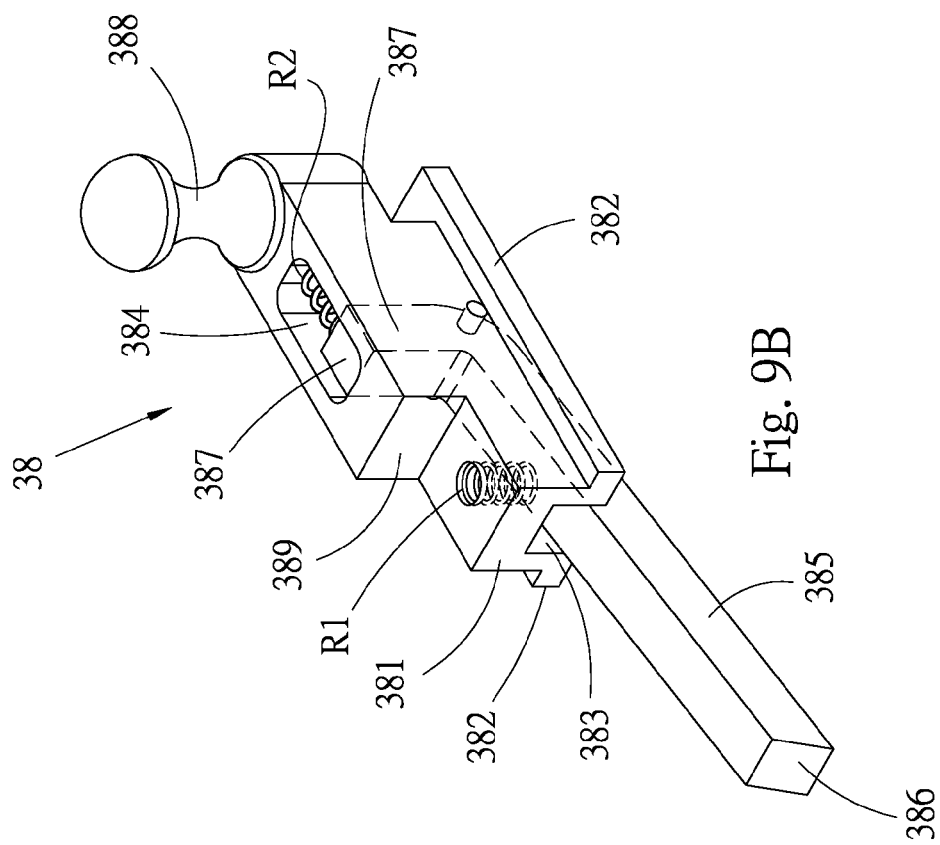
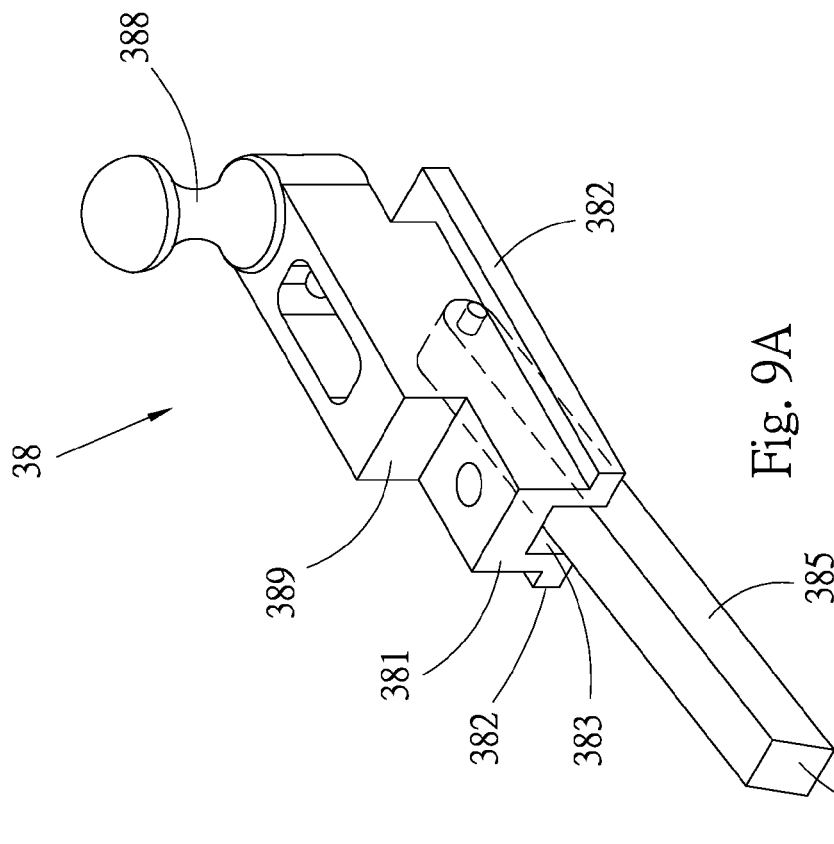

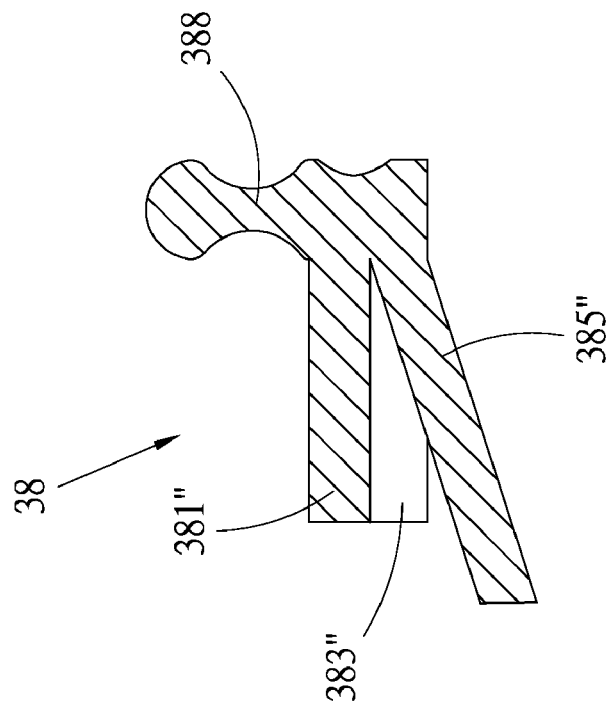
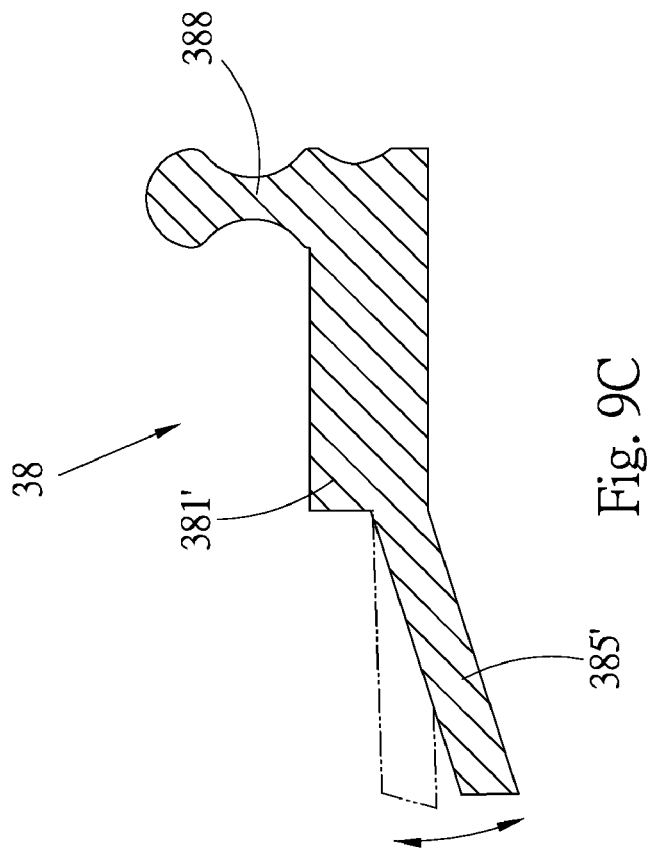
Fig. 9C
Fig. 9D

SERIAL-CONNECTION FITTING ASSEMBLY AND PUNCH APPRATUS APPLIED THEREFORE

BACKGROUND

1. Field of the Invention

The present invention relates generally to a member could be punched and an apparatus for utilizing said member, and is more specifically concerned with a serial-connection fitting assembly and a punch apparatus applied therefore.

2. Background of the Invention

Conventional desks, tables or furniture the like are made by plates, which are connected to one another by nails, screws or bolts. Nevertheless, the connection strength thereby isn't strong enough for use.

Another conventional fabrication of plates' connection is illustrated in FIG. 1. A first plate 12 is pre-formed with a through hole 122 and an indentation 124 communicated with the through hole 122. A second plate 14 is pre-formed with a through hole 142. A fitting member 10 is inserted into the indentation 124 of the first plate 12 in a manual way. The through holes 122, 142 are aligned with each other in order to insert a fastener 16, such as screws, for putting and securing the first and second plates 12, 14 together. The fitting member 10 is cylindrical and has a conjunction hole 102 and a groove 104 thereof The groove 104 is formed on a top surface of the fitting member 10 and parallel to the conjunction hole 102. During the plate fabrications, the direction of the groove 104 could be adjusted after the insertion of the fitting member 10, the conjunction hole 102 is operated to align with the through hole 122 thereby to enable the fastener 16 penetrate in the conjunction hole 102 and secure to the fitting member 10. This fabrication of plates' connection provides good connection strength between the plates 12, 14. However, the fabrication process is still time-wasting and inconvenient due to the labor consumption incurred by the manual insertion; besides, the manual insertion consequentially fails to meet mass manufacture.

SUMMARY OF THE INVENTION

A primary object of the present invention is to provide a serial-connection fitting assembly and a punch apparatus applied therefore, to increase the efficiency of the insertions of the fitting members so as to meet mass manufacture.

Another object of the present invention is to provide a serial-connection fitting assembly and a punch apparatus applied therefore, to create great alignment precision of the fitting members.

According to primary aspect of the present invention, a serial-connection fitting assembly and a punch apparatus are provided. The serial-connection fitting assembly includes a plurality of fitting members and a plurality of joining members staggered with the fitting members. The fitting members are in alignment and made with the joining members integrally in one piece. Each fitting member has a cylindrical body, a conjunction hole radially arranged in the cylindrical body, and a groove indented radially on a top surface of the cylindrical body with the same axial direction of the conjunction hole. The punch apparatus includes a punch body, a case connected to the punch body, a shove component sliding in the case, and a resilient component disposed in the case for moving the shove component forward. The case has a sliding channel and an accommodating channel formed longitudinally therein and communicated with each other; the serial-connection fitting assembly is loaded into the sliding channel. The shove component includes a base and an arm connected to the base. The base sits in and slides along the accommodating channel; the arm has a free end extending into the sliding channel so as to retain against the serial-connection fitting assembly. The resilient component exerts a forward force on the shove component in order to push the serial-connection fitting assembly toward a front of the case.

Therefore, the fitting members of the serial-connection fitting assembly could be punched into pre-holes of respective plates one by one via the punch apparatus; each fastener is applied to the respective fitting member for connecting two relative plates together.

The joining member adjacent to the in-position fitting member is broken as the punch body punches the frontmost fitting member that is in position; thereby the punched fitting member could be speedy outwardly for inserting into the pre-hole of the plates. Thus, the requirements to increase the insertion efficiency of the fitting members and the assembly efficiency of the plates would be achieved.

Furthermore, the punch apparatus provides continuous punches so as to offer speedy mass insertions of the fitting members; the production capacity is raised thereby.

In addition, because the axial direction of the conjunction hole is in a predetermined relationship with the longitudinal direction of the punch apparatus, it is easy to operate for guaranteeing the conjunction hole aligning with the secure direction of the respective fastener; the alignment precision of the fitting members could increase thereby.

BRIEF DESCRIPTION OF THE DRAWINGS

These and other objects and advantages of the present invention will be more readily apparent after consideration of the following description in conjunction with the drawings.

FIGS. 5A-5B are side views illustrating different embodiments of the fitting member of the serial-connection fitting assembly;

FIGS. 9A-9B are the perspective views illustrating different embodiments of a shove component according to the present invention;

FIGS. 9C-9D are the side views illustrating additional embodiments of the shove component according to the present invention.

DETAILED DESCRIPTION OF THE PREFERRED EMBODIMENTS

Certain embodiments as disclosed herein provide for a serial-connection fitting assembly which has a plurality of fitting members and joining members staggered in alignment. The serial-connection fitting assembly can be loaded into a punch apparatus for speedy insertion to the respective plates, so as to shorten time and labor consumption and to meet mass manufacture during the fabrication of plates' connection.

Figure 1:
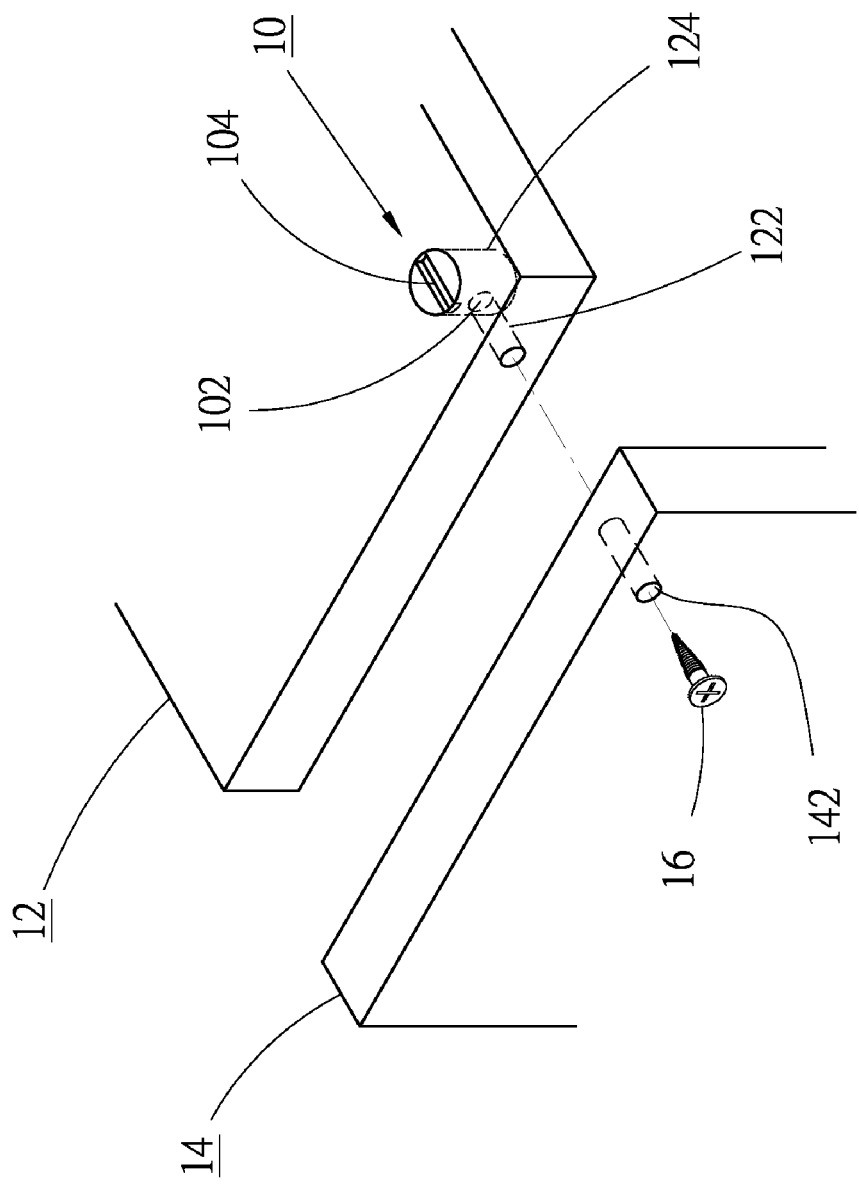
FIG. 1 is a perspective view illustrating a conventional fabrication concerning two plates and one fitting member.
Figure 2:
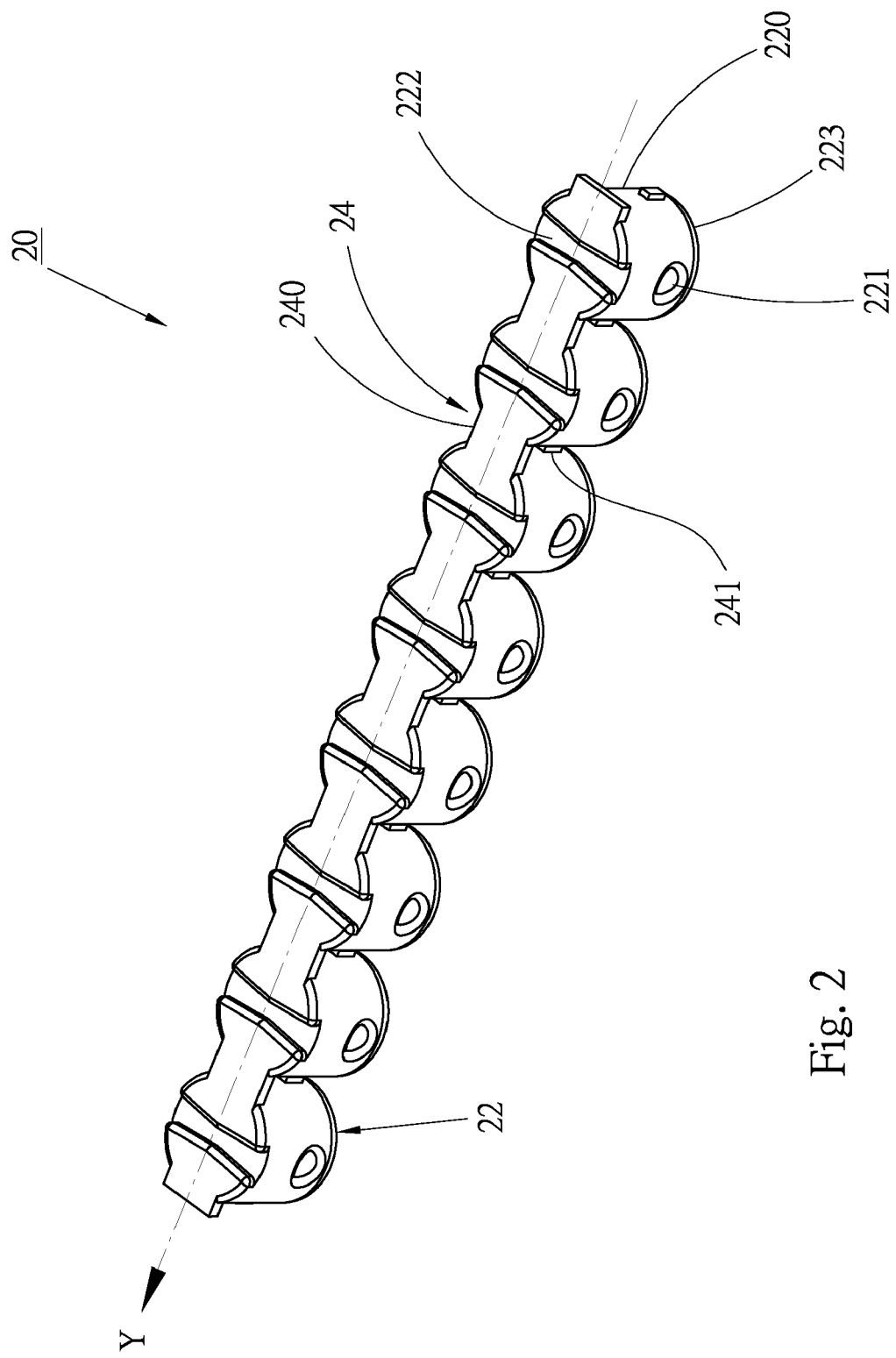
FIG. 2 is a perspective view illustrating a serial-connection fitting assembly according to the preferred embodiment of the present invention.
Figure 3:
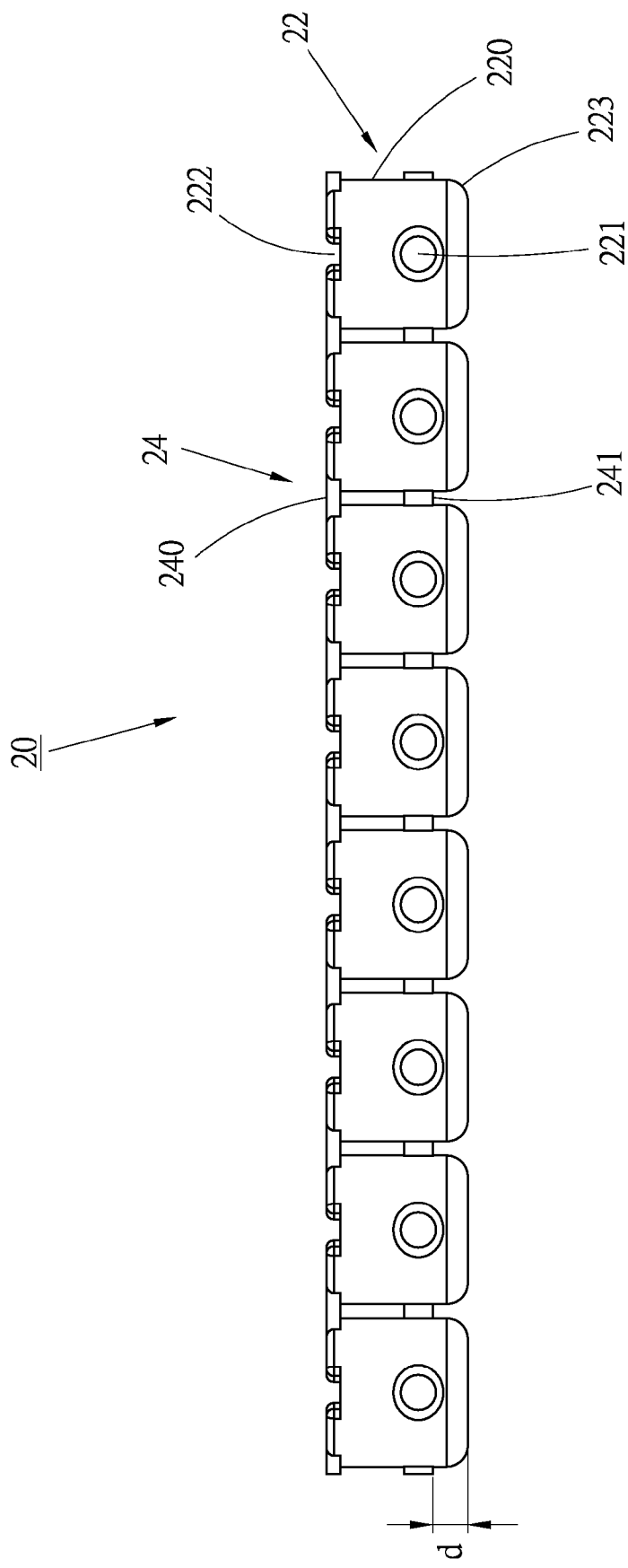
FIG. 3 is a side view according to FIG. 2.

FIGS. 2 and 3 illustrate a preferred embodiment of a serial-connection fitting assembly 20 according to the present invention. The serial-connection fitting assembly 20 includes a plurality of fitting members 22 and a plurality of joining members 24. The joining members 24 are staggered with the fitting members 22; each joining member has two lateral sides connected to adjacent two fitting members. Therefore, the fitting members 22 can be set in alignment through the connection between the joining members 24. The joining members 24 and the fitting members 22 can be made integrally in one piece via stamping manner or injection molding. The serial-connection fitting assembly 20 could be further pointed out to be made of a resilient material, which is applied to injection molding.

Each fitting member 22 has a cylindrical body 220, a conjunction hole 221 radially arranged in the cylindrical body 220, and a groove 222 indented radially on a top surface of the cylindrical body 220 and with the same axial direction of the conjunction hole 221. In this preferred embodiment, the axial direction of the conjunction hole 221 (, same as the groove 222,) is perpendicular to an axis "Y" indicating a connection direction of the fitting members 20.

Figure 4A:
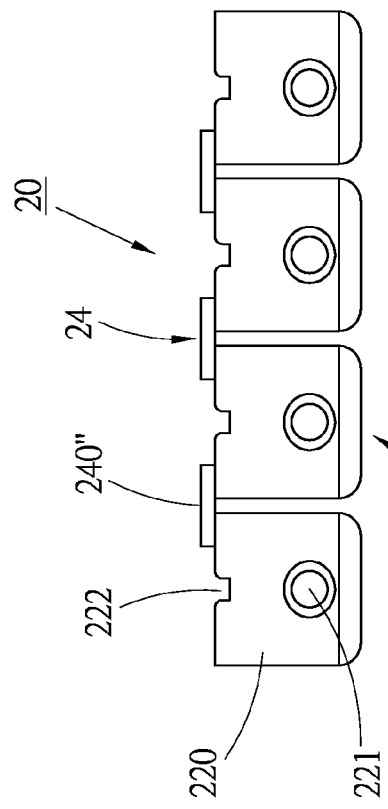
FIGS. 4A-4D are side views illustrating several embodiments of the serial-connection fitting assembly.
Figure 4B:
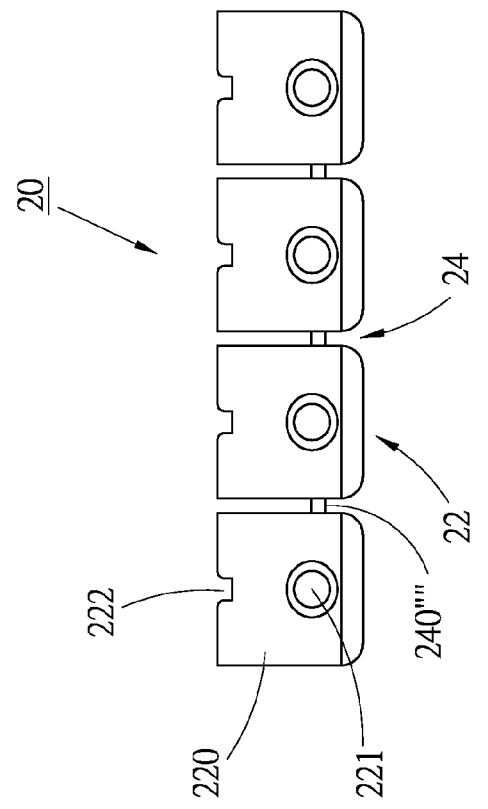
Figure 4C:
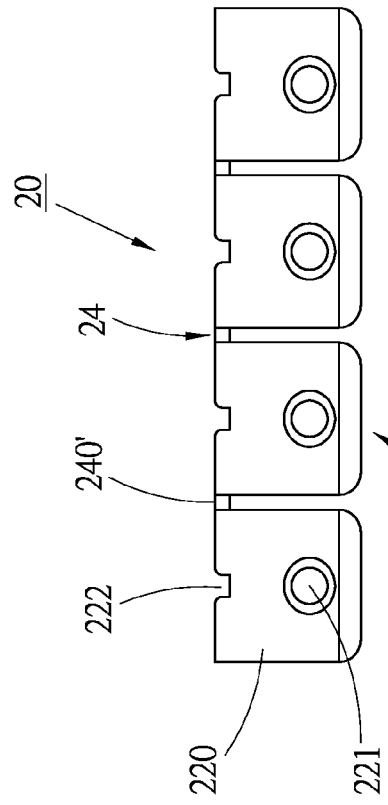
Figure 4D:
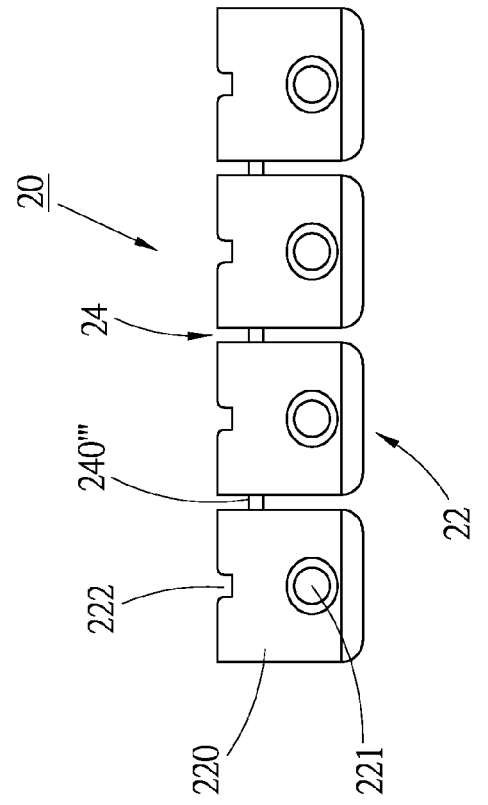

Each joining member 24 includes a first joining portion 240 and a second joining portion 241 individual from each other. In this preferred embodiment, two lateral sides of the first joining portion 240 respectively connect to tops of the two adjacent cylindrical bodies 220, and the two lateral sides of the second joining portion 241 respectively connect to bottoms of the two adjacent cylindrical bodies 220. The embodiment of the second joining portion 241 and the juncture on the cylindrical body 220 are not restrained according to the present invention. The second joining portion 241 is disposed onto a juncture of the cylindrical body 220, and the juncture is spaced from the bottom of the cylindrical body 220 via a small distance "d". However, there is not necessary that the first and second joining portions 240, 241 exist at the same time. The first joining portions 240 could exist only as illustrated in various embodiments in FIGS. 4A-4D. A first joining portion 240', in FIG. 4A, levels at top surfaces of the two adjacent cylindrical bodies 220. A first joining portion 240", in FIG. 4B, connects to top surfaces of the two adjacent cylindrical bodies 220 and is not at the same level. A first joining portion 240''', in FIG. 4C, connects to annular walls of the two adjacent cylindrical bodies 220; the juncture on the cylindrical body 220 is not restrained so that the first joining portion 240''' can be arranged on the top of the annular wall of cylindrical body 220. Therefore, the junctures in FIGS. 4A-4C conform to that the first joining portion connects to the top of the cylindrical body. A first joining portion 240'''' connects to bottoms of the two adjacent cylindrical bodies 220, or specifically connects to bottoms of annular walls of the two adjacent cylindrical bodies 220 to alternatively leveling at bottom surfaces of the two adjacent cylindrical bodies 220. The embodiment of the first joining portion 241'''' and the juncture on the cylindrical body 220 are not restrained; the juncture of the cylindrical body 220 could be specifically spaced from the bottom of the cylindrical body 220 via a small distance "d".

The groove 222 of each fitting member 22 may be a through groove or a stopped groove. In FIG. 5A, the groove 222 and the conjunction hole 221 radially penetrate the cylindrical body 220 at the same time. The cylindrical body 220 further has a thread 224, in FIG. 5B, formed in the conjunction hole 221 for adapting a fastener 50, in FIG. 6. The thread 224 thereof increases the friction between the fastener 50 and the cylindrical body 220 so as to intensify the connection strength between two respective places 41, 42. There is no need to detail the fastener 50, in FIG. 6, due to the variety of the embodiments thereof, however, the fastener 50 could be a self-tapping screw and the thread 24 could be self-tapping for adapting the self-tapping screw.

Figure 6:
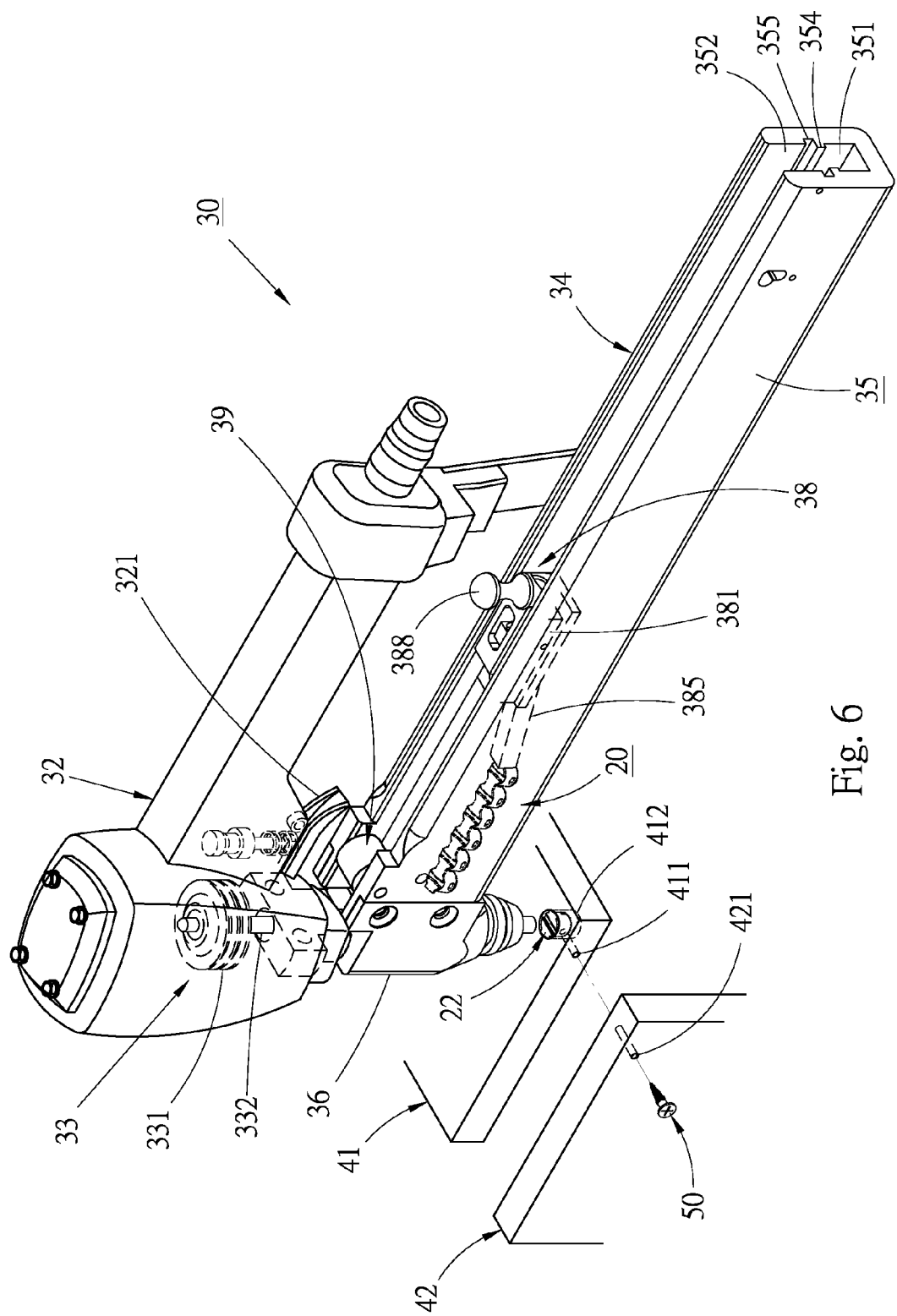
FIG. 6 is a perspective view illustrating a punch apparatus applied for the serial-connection fitting assembly in use according to the preferred embodiment of the present invention.
Figure 7:
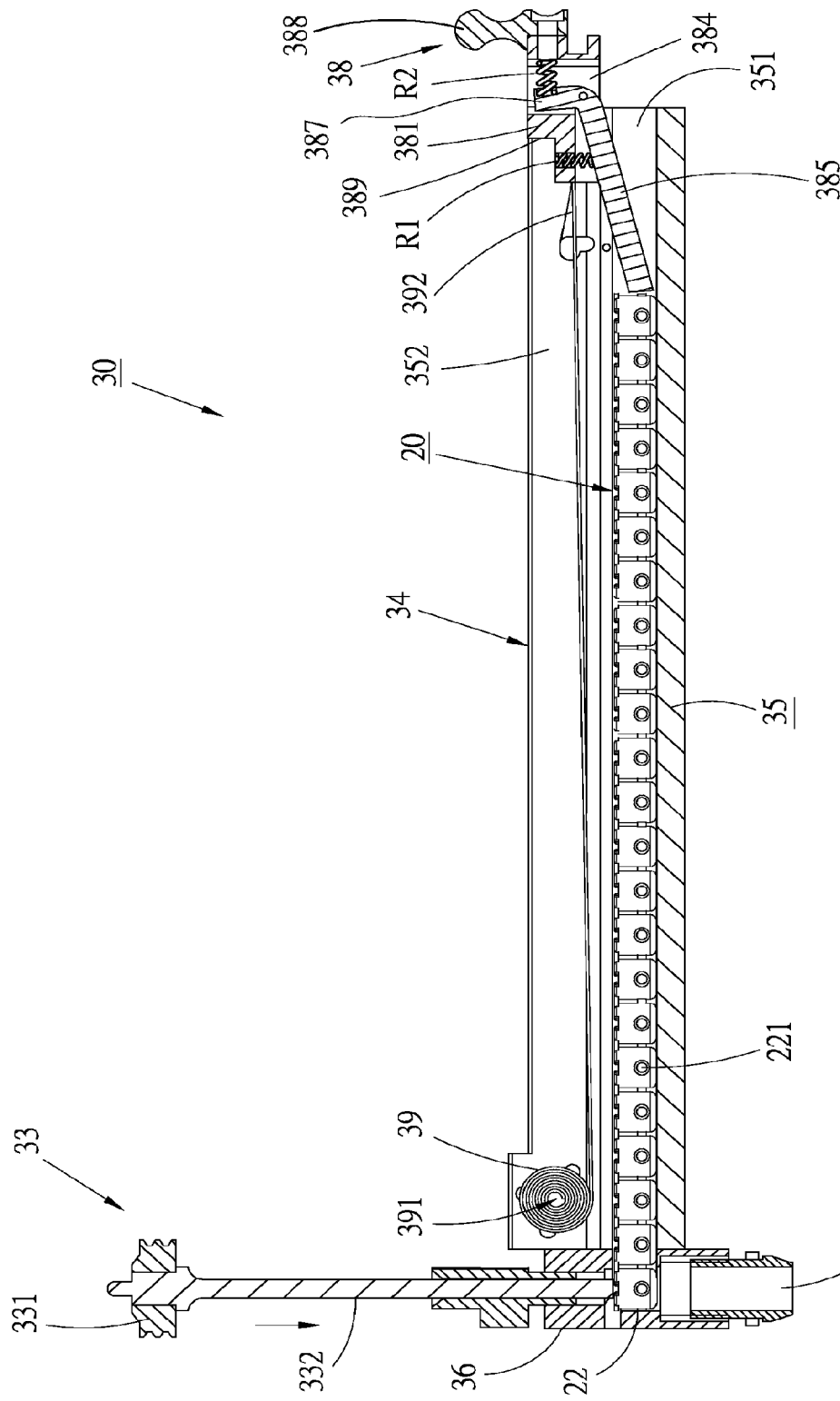
FIG. 7 is a longitudinal profile illustrating the punch apparatus in use.

Please referring to FIGS. 6 and 7, a punch apparatus 30 applied with the serial-connection fitting assembly 20 is illustrated according to the preferred embodiment of the present invention. The serial-connection fitting assembly 20 is loaded into the punch apparatus 30; a frontmost one of the fitting members 22 could be in position and punched into a pre-hole 412 of a respective plate 41 by the punch apparatus 30; the through holes 411, 421 of two plates 41, 42 are aligned with each other; the fastener 50 goes through the through holes 411, 421 to secure in the conjunction hole 221 of the punched fitting member 22; and then the two plates connect to each other.

The punch apparatus 30 includes a punch body 32, a punch assembly 33 arranged in the punch body 32, a case 34 connected to the punch body 32, a shove component 38 sliding in the case 34, and a resilient component 39 for moving the shove component 38 forwards.

The punch apparatus 30 may be a pneumatic or electrical apparatus. In this preferred embodiment, the punch apparatus 30 is pneumatic; the punch body 32 includes a cylinder (, not shown) and a trigger 321. The punch assembly 33 includes a piston 331 and a firing pin 332; the piston 331 is arranged in the cylinder. When the trigger 321 is pressed, the punch body 32 will be activated to exert a punch thrust. The punch assembly 33 receives the punch thrust so that the firing pin 332 provides a reciprocate movement for traveling upwards and downwards.

Figure 8:
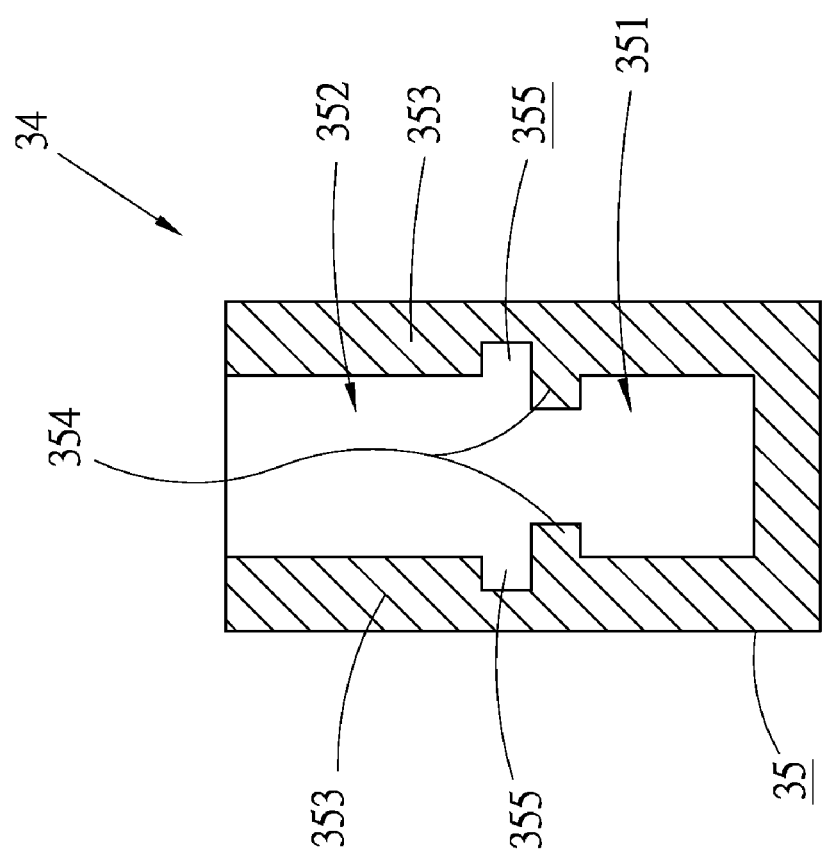
FIG. 8 is a cross-sectional profile illustrating an elongated housing of the punch apparatus according to the preferred embodiment.

The case 34 includes an elongated housing 35, and a lid portion 36 arranged at a front of the housing 35. The lid portion 36 includes a bore 361 formed longitudinally therein and a lateral opening 362. The bore 361 is used for the firing pin 332 moving therein and traveling upwards and downwards, as illustrated in FIG. 7. The elongated housing 35 has a longitudinal axis paralleled to the axis "Y", which indicates a connection direction of the fitting members 20, that means the axial direction of the conjunction hole 221, which the axial direction of the groove 222 is in accordance with, is in a predetermined relationship with the longitudinal direction of the punch apparatus. The housing 35 includes a sliding channel 351 and an accommodating channel 352 formed therein. The sliding and accommodating channels 351, 352 communicate with and parallel to each other. The sliding channel 351 communicates with the bore 361 via the lateral opening 362, shown in FIG. 10, and is used for loading the serial-connection fitting assembly 20. In the preferred embodiment illustrated in FIG. 8, the housing 35 is of an identical U-shaped cross section. The housing 35 has two flank walls 353, two ribs 354 projected inwardly from the flank walls 353 respectively, and two slots 355 recessed from the flank walls 353 and over the ribs 354 respectively. The ribs 354 separate the accommodating channel 352 from the sliding channel 351 inside the housing 35.

The fitting assembly 20 is loaded into the sliding channel 351 from a rear of the housing 35 and could slide along the sliding channel 351. The frontmost one of the fitting members 22 could be delivered into the bore 361 via the lateral opening 362 to be ready. When the trigger 321 is touched off, the firing pin 332 of the punch assembly 33 speeds up in the bore 361 and exerts a punch thrust onto the in-position fitting member 22, so that the joining member 24 adjacent to the in-position fitting member 22 is broken and separated therefrom. The in-position fitting member 22, pushed along the bore 361, inserts into the pre-hole 412 of the plate 41, in FIG. 6.

The shove component 38, in FIG. 9A, includes a base 381 sitting in the accommodating channel 352, a rim 382 extending laterally from the base 381 to fit in the respective slot 355, and an arm 385 connected to the base 381. The arm 385 has a free end extending into the sliding channel 351 so as to retain against the serial-connection fitting assembly 20. The base 381 can slide along the accommodating channel 352 forwards and backwards.

The resilient component 39 has an end 391 disposed at the front of the housing 35 and an opposite end 392 connected to the shove component 38, so that the elastic energy of the resilient component 39 moves the shove component 38 forward the front of the housing 35. The resilient component 39 could be different type of members that offers resiliency, in the preferred embodiment, specifically could be a volute spring. The volute spring is fixed at the front of the housing 35 via a bolt (not shown) by the end 391, and secured to the base 381 of the shove component 38 by the opposite end 392.

The operation of the punch apparatus 30 now is in detailed description: the serial-connection fitting assembly 20 is loaded in to the sliding channel 351 of the punch apparatus 30. The arm 385 of the shove component 38 retains against the rearmost one of the fitting members 22. The shove component 38 moves forwards by the pulling force of the resilient component 39 so as to push the fitting assembly 20 forwards until the frontmost fitting member 22 is in position and ready for insertion, in FIG. 7. The firing pin 332 of the punch assembly 33 thrusts the in-position fitting member 22 to break the adjacent joining member 24. The in-position fitting member 22 speeds to insert into the pre-hole 412 of the plate 41, in FIG. 6. The shove component 38, pulled by the resilient component 39, moves a followed fitting member, just next to the previous one, to be in position for the next punch. Therefore, the punch apparatus 30 provides continuous punches for the fitting members 22 inserting into pre-holes 412 one by one in a short time, so as to replace the manual insertion of the fitting members and to increase the insertion efficiency instead.

Furthermore, the punch apparatus 30 provides continuous punches so as to shorten time and labor consumption and to meet assembly efficiency increase and mass manufacture during the fabrication of plates' connection.

In addition, the axial direction of the conjunction hole 221 in a predetermined relationship with the longitudinal direction of the punch apparatus 30 is determined as the fitting assembly 20 loads in. Because the longitudinal axis of the elongated housing 35 parallels to the axis "Y" of the fitting assembly 20, the axial direction of the conjunction hole 221 is perpendicular to the housing 35. It is easy to operate for guaranteeing the conjunction hole 221 of the fitting member aligning with the secure direction of the respective fastener 50 if on the basis of the predetermined relationship between the axial direction of the conjunction hole 221 and the longitudinal axis of the elongated housing 35. Thus, it's benefit to align the conjunction hole 221 of the fitting member with the through hole 411 of the plate 41; the great alignment precision of the fitting members is created thereby.

Figure 10:
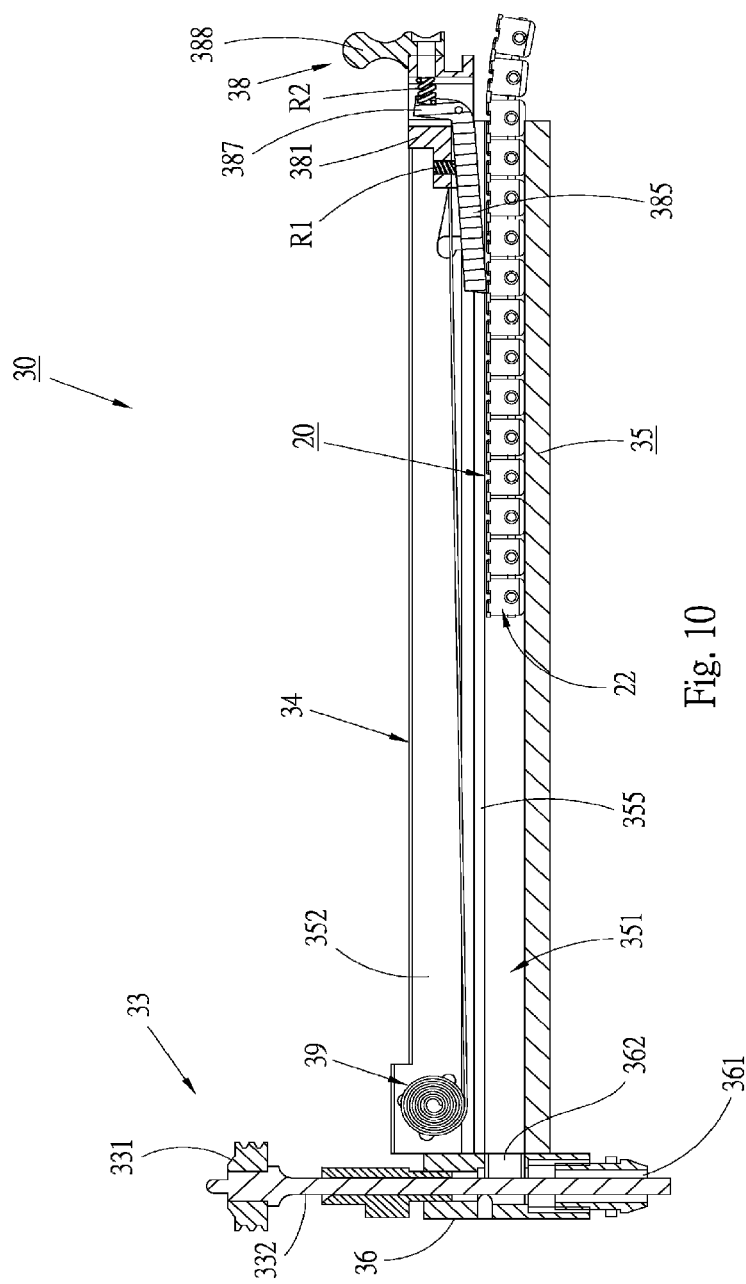
FIG. 10 is a longitudinal profile illustrating the punch apparatus, as the serial-connection fitting assembly loads, according to the present invention.

The base 381 has a cavity 383 indented from a bottom thereof, so as to receive the arm 385, shown in FIG. 9A. The arm 385 is pivoted in the cavity 383 of the base 381 so that the arm 385 swings in the cavity 383 and the free end thereof falls down to the sliding channel 351 due to the gravity. Referring to FIG. 10, the arm 385 is pushed by the fitting assembly 20 to swing and up to the cavity 383, as the fitting assembly 20 is loaded into the housing 35; no power or additional device is needed to drive the arm 385 upwardly, and that keeps low cost.

Furthermore, the arm 385 has a slantwise face 386 formed on the free end thereof to retain against the annular wall of the rearmost fitting member. The increase of the contact area, because of the slantwise face 386 of the arm 385, generates the push stability between the arm 385 and the rearmost fitting member. The slantwise face 386 set with an appropriate push angle of the arm 385 avoids the friction between the arm 385 and the housing 35 so as to prolong the service life of the shove component 33.

The base, in FIG. 9B, includes a hollow 384 communicating with the cavity 383, the arm 385 includes a prop portion 387 extended from a pivot end thereof with a predetermined angle for retaining in a hollow 384 of the base 381. When the free end of the arm 385 falls down by gravity, the prop portion 387 against inner walls in the hollow 384 also controls the push angle of the arm 385. The slantwise face 386 and the prop portion 387 both offer similar effectiveness but, however, are not restrained to be implemented at the same time.

Referring to FIGS. 7, 9B and 10, the shove component 33 further includes elastic members R1, R2 connected the arm 385 to the base 381 to provide the elasticity to the arm 385. The elastic member R1 is arranged alternatively at a front of the base 381 and in the cavity 383 of the base 381, to connect to a main portion of the arm 385. The elastic member R2 is oriented in the hollow 384 of the base 381 and connected to the prop portion 387 of the arm 385. When the shove component 33 pushes the fitting assembly 20, the elastic members R1, R2 provide pulling and pushing forces respectively to keep the push gesture of the shove component 33. The elastic members R1, R2 not restrained to be implemented at the same time.

Besides, to achieve the similar above-mentioned effectiveness, another embodiment of the shove component 33 is disclosed in FIGS. 9C, 9D. An arm 385' extends from a base 381' as an integral one piece with a predetermined angle towards the sliding channel 351. The predetermined angle guarantees the arm 385' retain against the fitting assembly 20. The base 381' and the arm 385' are made of a resilient material also guarantees the arm 385' swing upwards due to the resiliency of itself, illustrated with an imaginary line in FIG. 9C, as the fitting assembly 20 loads in. After the fitting assembly 20 passes the arm 385' completely, the arm 385' swings downwards to be at original angle to touch against the rear most fitting member of the fitting assembly 20. Where the arm 385' extends is not restrained. Referring to FIG. 9D, a base 381" has a cavity 383" formed at the bottom thereof; an arm 385" also extends from the base 381", specifically extends from the bottom of the base 381', outwardly to the sliding channel 351. The arm 385" swings upwards to the cavity 383" for reception, as the fitting assembly 20 loads in.

The shove component 33 further includes a grasp portion 388, shown in FIGS. 7, 9A-9D and 10, extended upwardly from the base 381. The grasp portion 388 protrudes out of the housing 35 for a user holding easily. Furthermore, the base 381 includes a step portion 389, referring in FIGS. 7 and 9A-9B, formed at a front of a top thereof. The step portion 389 is used for the user hooking up to move the shove component 33 backwards. However, the grasp portion 388 and the step portion 389 are not restrained to be implemented at the same time.

Another aspect according to the present invention, the cylindrical body 220 further includes a beveled edge 223, referring in FIGS. 2 and 3, circularly connecting between a bottom surface thereof and an annular wall thereof The beveled edge 223 guarantees not only a smooth delivery in the bore 361, but also a smooth insertion in the pre-hole 412.

The foregoing description of the embodiments of the invention has been presented for the purposes of illustration and description. The fitting assembly 20 and the punch apparatus 30 applied therefore according to the present invention increase the efficiency of the insertions of the fitting members 22 so as to meet mass manufacture, to shorten time and labor consumption in process, and to create great alignment precision of the fitting members 22.

It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A serial-connection fitting assembly for mounting into boards, comprising:
    a plurality of fitting members setting in alignment, each fitting member having a cylindrical body, a conjunction hole radially arranged in the cylindrical body, and a groove indented radially on a top surface of the cylindrical body and with same axial direction of the conjunction hole; and
    a plurality of joining members staggered with the fitting members and made integrally in one piece, each joining member having two lateral sides connected to adjacent two fitting members;
    whereby the fitting members are serially connected via the respective joining members.

2. The serial-connection fitting assembly according to claim 1, wherein the axial direction of the conjunction hole is perpendicular to an axis indicating a connection direction of the fitting members.

3. The serial-connection fitting assembly according to claim 1, wherein each joining member includes at least one joining portion, which has two lateral sides respectively connected to tops, bottoms or annular walls of the two adjacent fitting members.

4. The serial-connection fitting assembly according to claim 3, wherein the two lateral sides of the joining portion respectively connected to top surfaces of the two adjacent fitting members.

5. The serial-connection fitting assembly according to claim 4, wherein the joining portion levels at the two adjacent fitting members.

6. The serial-connection fitting assembly according to claim 3, wherein each joining member further includes another joining portion, individual from the previous one, having two lateral sides respectively connected to bottoms of the two adjacent fitting members.

7. The serial-connection fitting assembly according to claim 6, wherein the cylindrical body has a juncture, where the later joining portion is disposed, being away from a bottom surface thereof via a small distance.

8. The serial-connection fitting assembly according to claim 1, wherein the cylindrical body further includes a beveled edge circularly connecting between a bottom surface thereof and an annular wall thereof.

9. A punch apparatus applied with the serial-connection fitting assembly as claimed in claim 1, comprising:
    a punch body for exerting a punch thrust;
    a punch assembly arranged in the punch body, receiving the punch thrust and providing a reciprocate movement for traveling upwards and downwards;
    a case connected to the punch body, the case including an elongated housing, and a lid portion arranged at a front of the housing; the housing being of an identical cross section and including a sliding channel and an accommodating channel formed therein, the sliding and accommodating channels communicated with and paralleled to each other, and the sliding channel being used for loading the serial-connection fitting assembly; the lid portion having a bore formed longitudinally therein, and the bore communicating with the sliding channel; the punch assembly being capable of traveling through the bore upwards and downwards while the reciprocate movement is provided;
    a shove component including a base and an arm connected to the base; the base sitting in and sliding along the accommodating channel; the arm having a free end extending into the sliding channel so as to retain against the serial-connection fitting assembly; and
    a resilient component disposed in the case for moving the shove component forward the front of the housing, so that a frontmost one of the fitting members is pushed into the bore of the lid portion;
    whereby the fitting member is in position to be punched by the punch assembly so that the joining member adjacent thereto is broken to separate therefrom.

10. The punch apparatus according to claim 9, wherein the sliding channel is arranged under the accommodating channel.

11. The punch apparatus according to claim 9, wherein the shove component further includes a grasp portion extended upwardly from the base in order to protrude out of the housing.

12. The punch apparatus according to claim 9, wherein the base includes a step portion formed at a front thereof.

13. The punch apparatus according to claim 9, wherein the arm has a slantwise face formed on the free end.

14. The punch apparatus according to claim 9, wherein the base has a cavity indented from a bottom thereof, so as to receive the arm.

15. The punch apparatus according to claim 14, wherein the shove component includes an elastic member arranged alternatively at a front of the base and in the cavity of the base, to connect to a main portion of the arm.

16. The punch apparatus according to claim 14, wherein the arm is pivoted in the cavity of the base so as to swing therein.

17. The punch apparatus according to claim 16, wherein the base includes a hollow communicating with the cavity, the arm includes a prop portion extended from a pivot end thereof with a predetermined angle for retaining in the hollow of the base.

18. The punch apparatus according to claim 17, wherein the shove component includes an elastic member oriented in the hollow of the base and connected to the prop portion of the arm.

19. The punch apparatus according to claim 9, wherein the base and the arm are made of a resilient material as an integral one piece, the arm extends from the base with a predetermined angle towards the sliding channel.

20. The punch apparatus according to claim 19, wherein the base has a cavity indented from a bottom thereof, so as to receive the arm.

* * * * *